United States Patent [19]
Branick

[11] 3,917,250
[45] Nov. 4, 1975

[54] STRIP LAYING APPARATUS
[75] Inventor: Charles Earl Branick, Fargo, N. Dak.
[73] Assignee: Applied Power Inc., Milwaukee, Wis.
[22] Filed: June 21, 1973
[21] Appl. No.: 372,196

[52] U.S. Cl. .................... 270/30; 270/39; 56/116
[51] Int. Cl.² ..................................... B65H 29/46
[58] Field of Search .......... 19/160, 163; 270/31, 39, 270/37, 79, 30, 40; 53/116, 117, 170, 176; 28/21, 22; 242/86, 52

[56] References Cited
UNITED STATES PATENTS

| | | | |
|---|---|---|---|
| 2,986,781 | 6/1961 | Jackson et al. | 19/160 |
| 3,083,437 | 4/1963 | Davis, Jr. | 28/21 |
| 3,351,992 | 12/1967 | Carter | 19/160 |

FOREIGN PATENTS OR APPLICATIONS
1,015,642  1966  United Kingdom ............... 270/31

Primary Examiner—Robert W. Michell
Assistant Examiner—Vincent Millin
Attorney, Agent, or Firm—Fred Wiviott

[57] ABSTRACT

An apparatus for laying an elongate strip in a receptacle, having a feed assembly for receiving the material and directing the same into the receptacle, a carriage assembly for directing the discharge end of the feed assembly, and a drive assembly for alternately moving the carriage assembly backwardly and forwardly in the longitudinal direction over the receptacle and for stepping the feed assembly discharge end laterally a distance approximately equal to the width of the strip after the completion of each longitudinal movement.

14 Claims, 13 Drawing Figures

Fig_1

Fig_2

STRIP LAYING APPARATUS

BACKGROUND OF THE INVENTION

This invention relates to apparatus for laying strip material in a relatively uniform manner in a receptacle having a width several times that of the material.

One of the problems encountered in the manufacture of strip material, such as rubber strips which may, for example, be employed in the manufacture of tires, has been to package such material in suitable containers for shipment. It will be appreciated that at the point of ultimate use, such material is commonly fed into some continuous process apparatus. Accordingly, the disposition of such material in a container must be such that there will be no tangling or twisting which would interfere with uniform material withdrawal and feeding into the process apparatus. Prior art methods for containerizing elongate strip material generally involve costly manual operations to insure uniform distribution of the material.

It is an object of the invention to provide a new and improved strip laying apparatus.

A further object of the invention is to provide a strip laying apparatus for uniformly disposing an elongated strip of material in a container.

Another object of the invention is to provide an apparatus for packaging strip material which does not require costly hand operations.

These and other objects and advantages of the instant invention will become more apparent from the detailed description taken with the accompanying drawings.

SUMMARY OF THE INVENTION

In general terms, the invention comprises an apparatus for laying strip material including strip material receiving and discharging means, first means for moving the material discharge means a substantially uniform distant in a forward and reverse direction; and second means for moving the material discharge means an incremental distance in the lateral direction upon the completion of each forward and reverse movement.

DETAILED DESCRIPTION OF THE INVENTION

Figure 1:
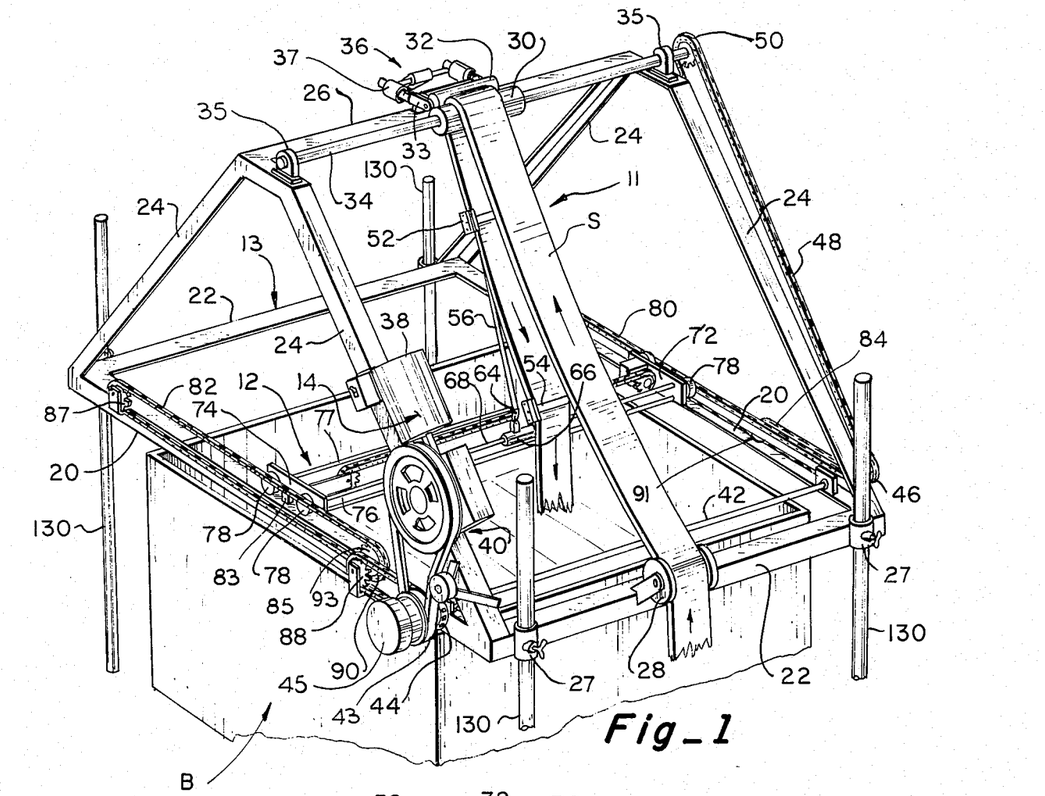
FIG. 1 is a perspective view of the strip laying apparatus according to the present invention.

The strip laying apparatus is shown in FIG. 1 generally to include a feed apparatus 11 for receiving the strip material S and for discharging the same into a container B. In order to uniformly distribute the material S in container B, the discharge end of feed assembly 11 is coupled to a carriage assembly 12 mounted for movement on a frame assembly 13 and coupled to a drive mechanism 14. As will be discussed more fully hereinbelow, drive mechanism 14 is operative to move the carriage mechanism 13 alternately back and forth along support frame 13 and to step the discharge end of the feed assembly 11 an incremental lateral distance at the completion of each forward and reverse movement.

Frame assembly 13 may be formed of any suitably shaped structural members which are joined in any convenient manner and may include a horizontal frame portion comprising a pair of side members 20 and end members 22. As will be more fully discussed below, the side members 20 act as rails for guiding and supporting the carriage assembly 12. In addition, frame assembly 13 includes an upper frame portion comprising a pair of members 24 each having a generally inverted V-shape and whose apex ends are joined by a cross member 26 and whose lower ends are joined to the junction of members 20 and 22. The frame assembly 13 may be mounted at a desired height above container B in any suitable manner such as by means of slide clamps 27 which are fixed to end members 22 and which slideably engage and may be clamped vertical corners posts 130.

The material feed assembly 11 includes an idle roller 28 mounted on one end member 22 for directing strip S upwardly to a drive roll 30 which is mounted on a horizontal shaft 34 extending between the apex ends of members 24 and supported for rotation by suitable bearings or pillow blocks 35. The discharge portion of feed assembly 11 includes a guide rod assembly 56 coupled at its upper end by a universal joint coupling 62 to cross member 26 at a point adjacent drive roll 30. The lower end of rod assembly 56 is coupled by a yoke 64 and pin 65 to an ear 67 extending upwardly from a sleeve 66 which is slideably mounted on a shaft 68 of the carriage assembly 12. In this manner, the lower end of rod assembly 56 will follow sleeve 66 as the latter is moved by the carriage assembly 12 and the drive assembly 14 in a manner which will be described more fully below. A pair of guide roll assemblies 52 and 54 are fixed in spaced apart relation on rod assembly 56 for receiving and guiding the strip S so that said strip will remain in general parallelism with rod assembly 58 as the lower end thereof follows the movement of sleeve 66 to which it is coupled.

Figures 8, 9, 10:
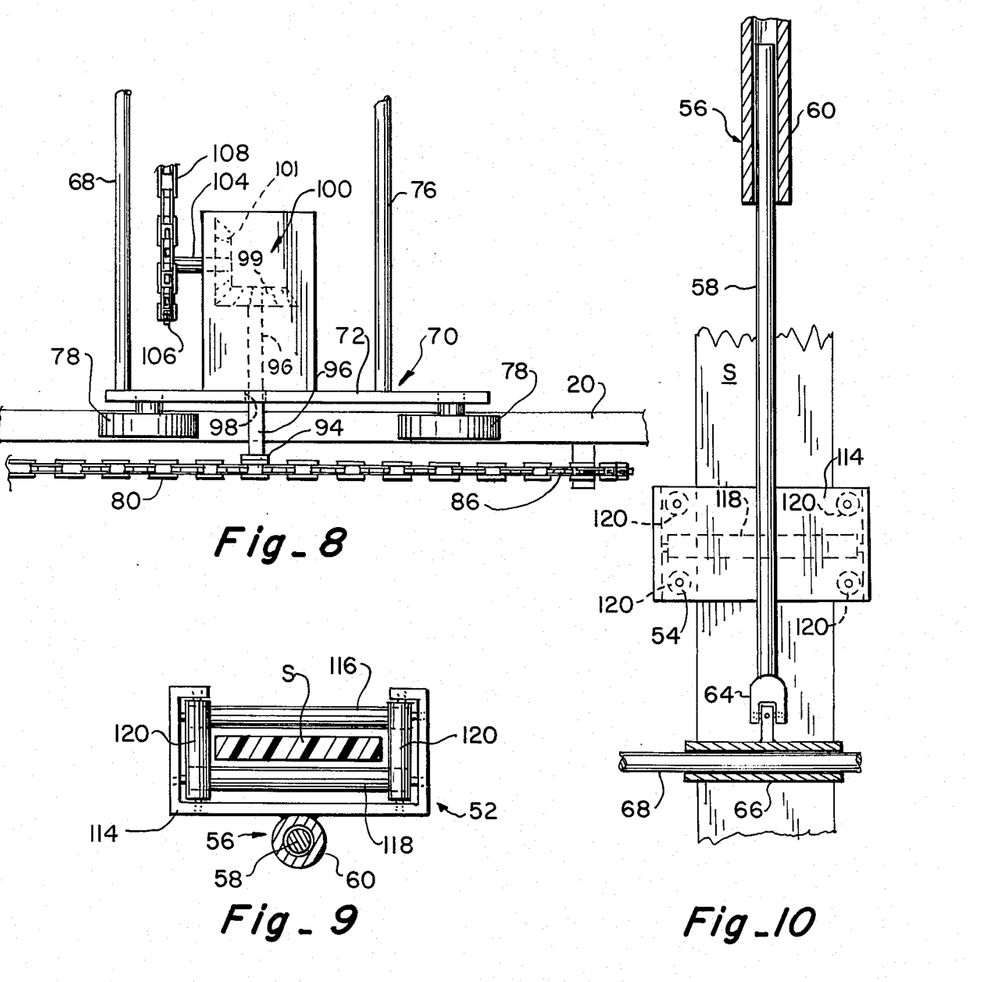
FIG. 8 is a view taken along lines 8—8 of FIG. 7.
FIG. 9 is a view taken along lines 9—9 of FIG. 2.
FIG. 10 is a view taken along lines 10—10 of FIG. 2.

With reference to FIGS. 9 and 10, the rod assembly 56 is shown to include a lower rod member 58 which is affixed at its lower end by universal coupling 64 to sleeve 66 and an upper tubular member 60 whose lower end is telescopingly received over the upper end of rod 58 and whose upper end is affixed to frame member 26 by the universal joint 62. The telescopic engagement between the lower rod member 58 and the upper tublar member 60 permits changes in span between the sleeve 66 and the upper frame member 26 as sleeve 66 is moved backwardly, forwardly and laterally with the carriage assembly as will be described in greater detail below.

The guide assemblies 52 and 54 are substantially identical and accordingly the same reference numerals will be employed for corresponding portions of each. As seen in FIG. 9, guide assembly 52 is attached to the tublar member 60 and assembly 54 is attached to member 58 in general parallelism with assembly 52. Each guide assembly includes a frame member 114 which is generally U-shaped in horizontal section. A first pair of generally parallel, longitudinal rollers 116 and 18 extend between and are journalled for rotation between the sides of frame member 114 and a second pair of generally parallel rollers 120 extend between and are journalled the back and end flanges of member 114. As seen in FIG. 9, a gap is formed between rollers 116 and 118 on the one hand, and rollers 120 on the other to permit the passage of strip S therethrough. It will be appreciated that the strip may pass freely between the pair of rollers and in addition will be guided longitudenally or laterally as the guide assemblies 52 and 54 move with the rod assembly 56.

Feed assembly 11 also includes a nip roller 32 which is mounted by means of support frame 36 in general parallelism with drive roll 30. Frame 36 includes a pair of parallel side bearing members 33 between which the roller 32 is journalled. A rod 35 extends from each end of bearing members 33 and each has a stop member 37 at its other end. A spring 39 extends between each bearing member 33 and stop member 37 to urge nip roller 32 into resilient engagement with drive roll 30 whereby strip S will be driven when roll 30 rotates. In addition, stop members 37 are pivotally mounted on member 26 to permit threading of strip S between rolls 30 and 32 at the commencement of a strip laying operation.

Figure 3:
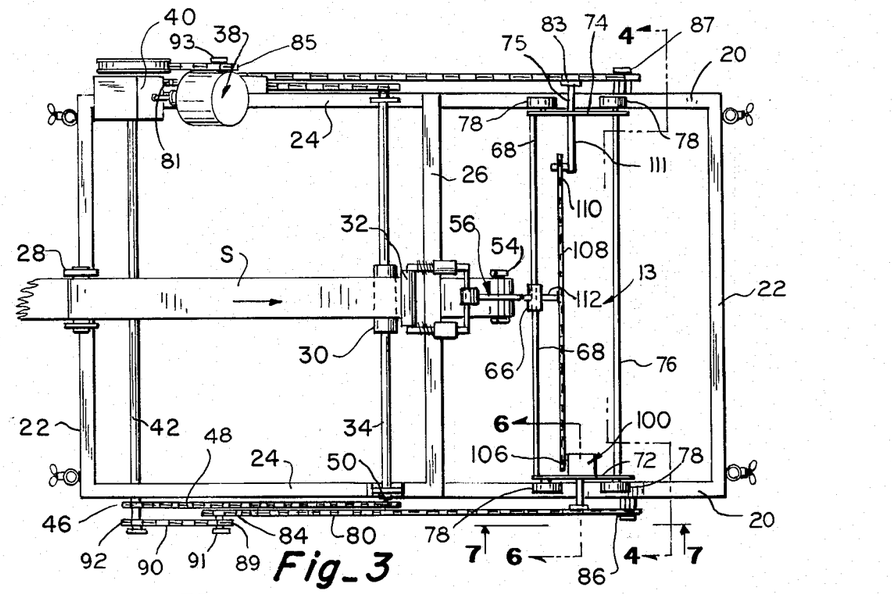
FIG. 3 is a top plan view of the strip laying apparatus shown in FIG. 1.

Carriage assembly 12 is shown in FIGS. 1 and 3 to include a pair of side plates 72 and 74 which extend generally in the direction of frame side members 20 and a pair of connecting, generally parallel rod members 68 and 76 are suitably affixed in a general perpendicular relation to side plates 72 and 74. In addition, a pair of wheels 78 are rotably mounted on each side plate 72 and 74 and each wheel 78 engages the frame side members 20. In this manner the carriage assembly 12 is mounted for low frictional rolling movement on members 20 for displacement forwardly and rearwardly relative to frame assembly 13.

Figure 4:
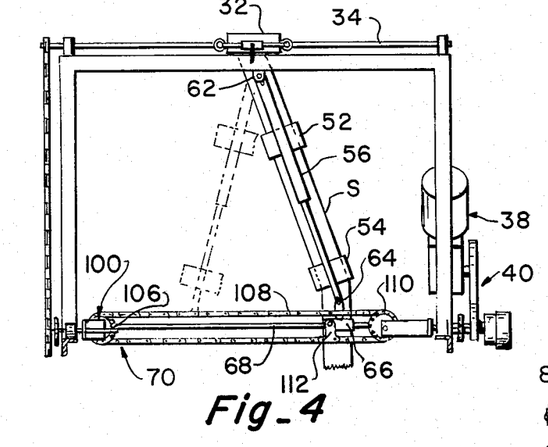
FIG. 4 is a view taken along lines 4—4 of FIG. 3.
Figure 6:
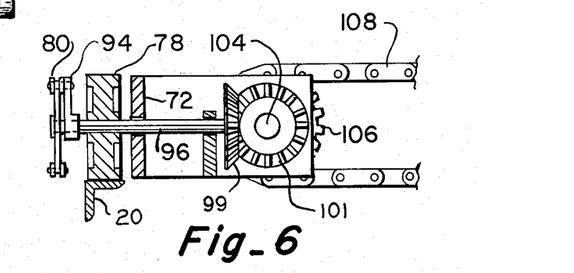
FIG. 6 is a view taken along lines 6—6 of FIG. 3.
Figure 7:
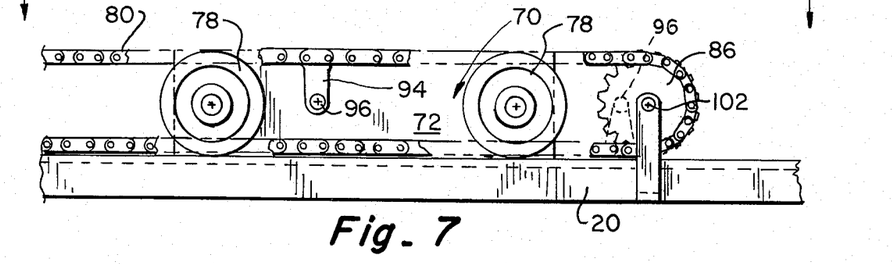
FIG. 7 is a view taken along lines 7—7 of FIG. 3.

As seen particularly in FIGS. 6–8, a pair of bevel gears 99 and 101 are journalled for meshing engagement within a housing 100 mounted on the inner surface of carriage side plate 72. Gear 99 has a shaft 96 which extends generally perpendicularly to side plate 72 and through an aperture 98 formed therein and has one end of a finger 94 affixed to its opposite end. The other end of arm 94 is affixed to the links of a chain 80 which forms a part of the drive mechanism 14 as will be explained below. It is sufficient to state at this point that when finger 94 is rotated by chain 80, bevel gear 99 will rotate through a corresponding angle. As seen more particularly in FIG. 8 gear 100 also has a shaft 104 which extends in a direction generally parallel to side plate 72. A sprocket 106 is affixed to the opposite end of shaft 104 and engages a drive chain 108 which also extends around an idler sprocket 110 mounted on side plate 74 by means of bracket 111 as seen in FIG. 3. In addition, a finger member 112 is coupled at one end to chain 108 and at its other to the sleeve 66 as shown in FIGS. 3 and 4. It will be appreciated that upon rotation of bevel gear 99, the chain 80 will move in one rotation of bevel gear 99, the chain 80 will move in one direction or the other to thereby also move sleeve 66 and the lower end of rod assembly 56 a corresponding distance.

Those skilled in the art will appreciate that while any suitable drive mechanism may be employed, in the illustrated embodiment a plurality of motor driven chain and sprocket drives are employed. Specifically, an electric motor 38 is suitably mounted on the frame assembly and is coupled by an output shaft to a suitable gear reduction mechanism 39. A sheave 40 is connected to the output shaft of gear reduction mechanism 39 and is connected by a belt 43 to a drive spindle 45. A main drive shaft 42 is coupled to spindle 45 and is journalled for rotation on frame 13 in general parallelism with frame member 22. Drive sprockets 44 and 92 are coupled to the opposite ends of drive shaft 42 and each is respectively coupled to endless drive chains 81 and 90. Chains 81 and 90' also extend over sprockets 88 and 89 which are mounted for on shafts 91 and 93 located a short distance toward the rear of frame member 20 from shaft 42. In addition a second sprocket 84 and 85 is disposed on each of shafts 91 and 93, respectively, and each respectively receives endless chains 80 and 82 which also extend over sprockets 86 and 87 adjacent the rear of frame 13. As will be discussed below, the span of chains 82 and 80 define the travel limits of carriage 17.

As seen in FIGS. 1 and 3 one end of a finger 83 is rotatably mounted on carriage side plate 74 by means of shaft 75 and the other end of finger 83 is affixed to chain 82. It will be appreciated, therefore, that as shaft 42 is rotated to rotate drive sprockets 44 and 92, carriage 13 will be moved in a longitudinal direction along frame 20 through the agency of chains 80 and 82 and arms 87 and 94. As seen in FIG. 3, a Third drive sprocket 46 is also mounted on shaft 42 and engages a chain 48 which extends upwardly and around a sprocket 50 which is affixed to shaft 31 of the feed assembly 11. It will be appreciated, therefore, that as shaft 42 rotates, the feed roll 30 will be driven to move the strip S in the direction of the arrows shown in FIG. 1.

Referring again to FIGS. 1 and 4, the spindle 45 is shown to have a plurality of cylindrical surfaces which may be engaged by belt 43. A tension wheel 51 journalled on rack 53 which in turn is pivotally mounted on frame 13 "adjacent belt 43." When wheel 51 is pivoted away from belt 43, the latter may be moved to a different cylindrical surface of spindle 45 so that the assembly may be driven at a different speed.

In operation of the strip laying apparatus 10, the end of the strip material S to be disposed in container B is placed between rollers 30 and 32 by initially pivoting the friction roll assembly frame 36 away from roll 30 so that strip S may be received therebetween. The end of strip S is then threaded between the guide roll assemblies 50 and 52 to place the strip S in general parallelism with rod assemly 56. The lower end of the strip then extends downwardly toward container B and the laying operation may then commence.

Figure 2:
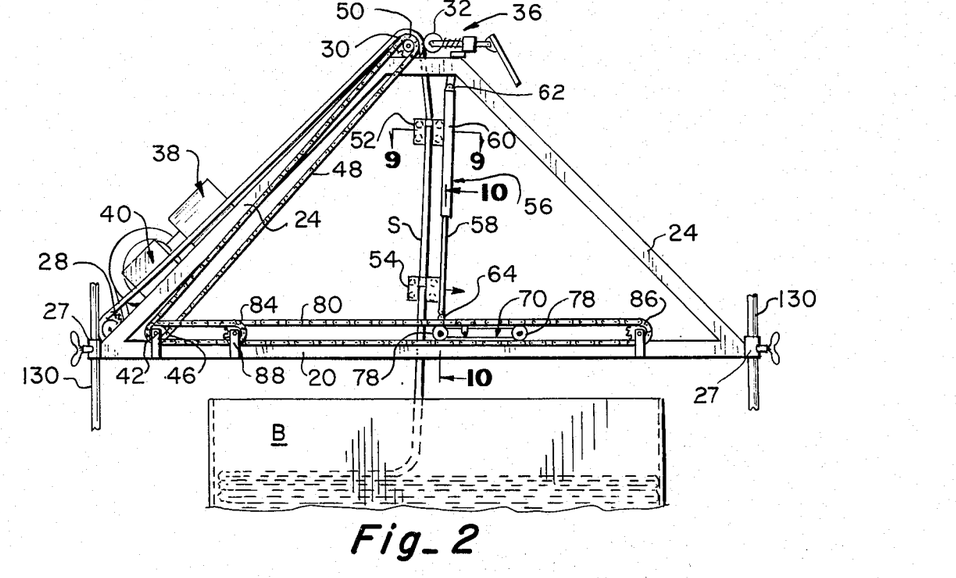
FIG. 2 is a side elevational view of the strip laying apparatus shown in FIG. 1.

Motor 38 is then energized to rotate drive shaft 42 through the agency of gear assembly 39, sheave 40, belt 43, and spindle 45. In order to move the strip S through the apparatus 10 and into container B it is necessary to rotate the drive shaft 42 in the counterclockwise direction as viewed in FIG. 1. This moves the upper portion of drive chains 82, 80 and 48 toward the left as viewed in FIG. 1 and lower portions of the said drive chains generally toward the right. When the carriage 23 is in its position shown in FIG. 1 the arms 87 and 94 extend upwardly and the portions of chains 80 and 82 engaged thereby are in their upward positions. The carriage 12 will then be moving toward the left as viewed in FIG. 1 (or to the right as viewed in FIG. 2) at the speed of the chains 80 and 82. When the arm 87 reaches the sprocket 86 and arm 94 reaches sprocket 89 the carriage 12 will be adjacent the rear of the assembly. Continued movement of the chains 80 and 82 will move arms 87 and 94 around their respective sprockets whereby the portion of chains 80 and 82 to which arms 87 and 94 are attached will be in their lower positions. As a result, the carriage will then begin moving toward the right as viewed in FIG. 1 (toward the left as viewed in FIG. 2) to begin return movement of the carriage toward the front of the assembly. Referring now to FIG. 7, which shows the arm 94 attached to shaft 96, it will be appreciated that as the chain 80 moves toward the right and arm 96 is carried therealong, shaft 96 remains stationary. However, as the arm 94 moves around sprockets 86 to its position shown by dashed lines shaft 96 and hence gear 99 will be rotated 180°. This rotation will be imparted to bevel gear 101 so that sprocket 106 will be rotated through a corresponding angle and chain 108 will be moved a corresponding distance. As a result, sleeve 66 which is affixed to chain 108 by arm 112 will similarly be moved an incremental distance each time arm 94 travels around the sprocket 86 at the rear end of the apparatus or sprocket 92 at the front end. The sleeve 66 continues to move an incremental distance in one direction until arm 112 moves around one of the sprockets 110 or 106 in which event the sleeve will begin moving an incremental distances in the opposite direction each time the shaft 96 is rotated by arm 94.

Figure 5:
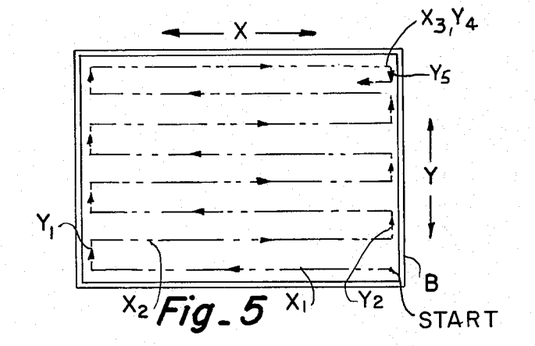
FIG. 5 scematically illustrates the operation of the strip laying apparatus illustrated in FIGS. 1-4.

To summarize the operation of the apparatus with respect to FIG. 5, the carriage 13 will preferably be initially positioned adjacent the front of the apparatus and the sleeve 66 positioned adjacent one side so that the strip material S will begin discharging at the Start point. When the apparatus is energized the carriage 13 will begin moving toward the rear of the assembly to begin placing the strip material along the line X1 and this will continue until the carriage 13 reaches the back end of the apparatus. At this point, the arm 96 will go around sprocket 86 to rotate shaft 96 whereupon the sleeve 66 will be moved an incremental distance along shaft 68 whereby the discharge end of the strip S will be moved laterally along the line Y1. In addition, the direction of carriage 13 will be reversed so that the strip material will begin to be disposed in container B along line X2. This will continue until the carriage 13 returns to the front end of the apparatus whereupon the sleeve 66 will be moved a second incremental distance Y2 shown in FIG. 5 and reversal will again occur in the longitudinal direction. As seen by the dashed lines and arrows in FIG. 5, a direction reversal and incremental movement of the strip material will occur at each end of the apparatus until the material reaches the point X3, Y4 in the upper right hand corner of FIG. 5. At this point the arm 112 coupled to chain 108 and sleeve 66 will move around one of the sprockets 106 or 110 to reverse the incremental movement in the Y direction so that the material moves along the line Y3 and in addition, the longitudinal direction reversal continues so that the strip would be laid along line X4. This direction reversal and stepping in the longitudinal direction will continue until the container B has been filled with strip S at which point the operation will be terminated.

Figure 11:
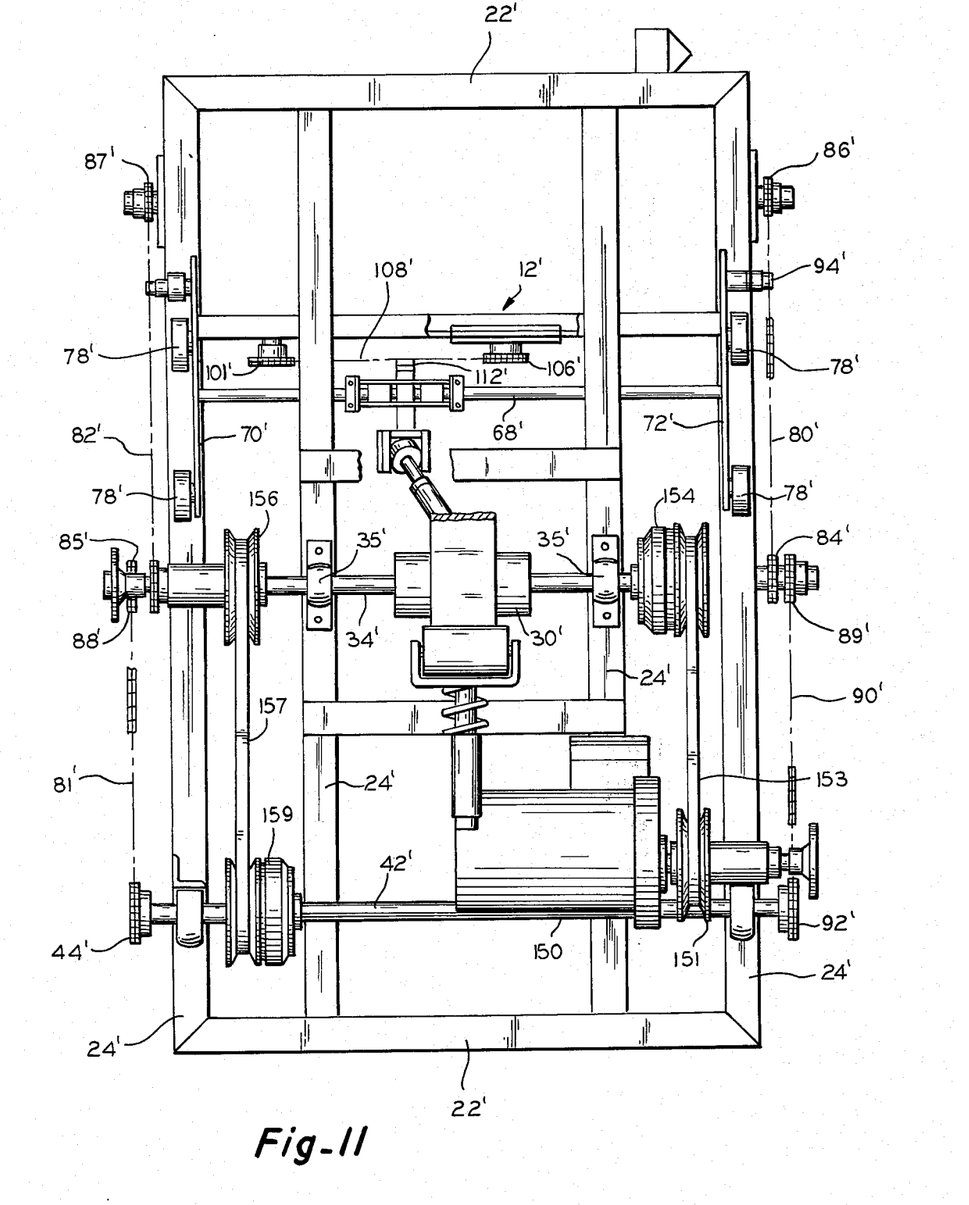
FIGS. 11-13 illustrate an alternate embodiment of the invention.
Figures 12, 13:
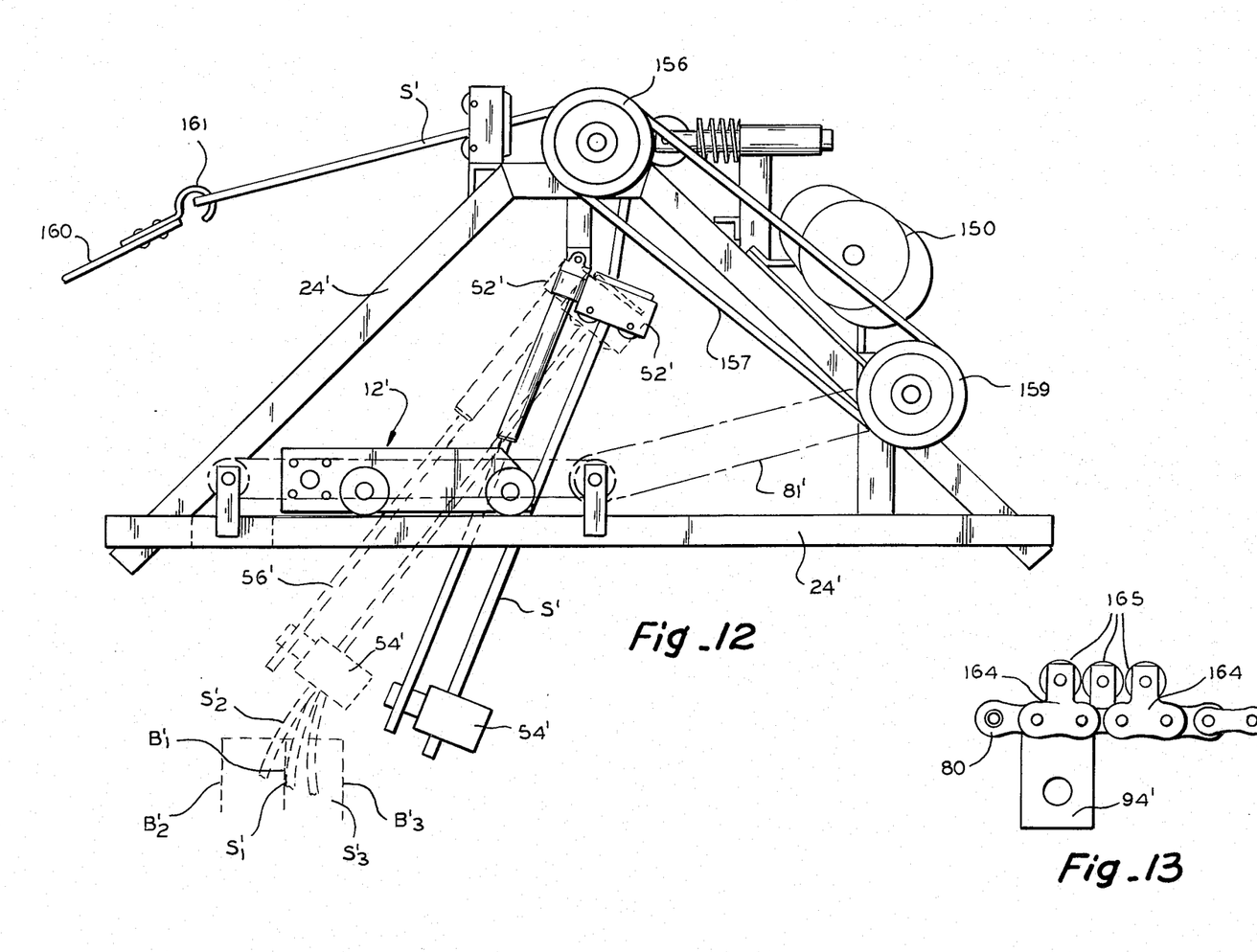

FIGS. 11 and 12 illustrate an alternate embodiment of the present invention and, accordingly, parts which correspond to similar parts of the embodiments of FIGS. 1 through 10 are identified by the same reference numerals but are distinguished by the use of a prime (1). The embodiment of FIGS. 11 and 12 differ from the embodiment of FIGS. 1–10 primarily in the power supply and drive coupling asssemblies. More specifically, embodiments of FIGS. 11 and 12 includes a gear-motor assembly 150 mounted on one of the frame members 24' and has a variable pitch pulley 151 attached to its output shaft. As those skilled in the art will appreciate, a variable pitch pulley is a device wherein the effective pulley diameter may be adjusted. This permits a wide range of affective belt speeds for any given gear-motor shaft rotation. Pulley 151 is coupled by a belt 153 to a second variable pitch pulley 154 which is mounted on one end of shaft 34' which is journalled for rotation in pillow blocks 35' mounted atop frame portions 24'. A third variable pitch pulley 156 is mounted on the other end of shaft 34' and is coupled by a belt 157 to another variable pitch pulley 159 which is mounted on shaft 42'.

The variable pitch pulleys 151, 154, 156 and 159 permit individual adjustment in the speeds of the belt S' and the carriage 12'. More specifically, adjustment of the variable pitch pulleys 151 and/or 154 adjusts the speed of the drive roll 30' in relation to the output shaft of the gear motor 150. In addition, adjustment of the variable pitch pulleys 156 and 159 permits variation in the speed between the drive roller 30' and the shaft 42' which in turn controls the speed of carriage 12'. In this manner, the length of material deposited in the container B for each pass of the carriage 12' can be varied. This action will be more fully appreciated with reference to FIG. 12. The phantom position shows the rod assembly 56' at the extreme end of its travel in one direction. Assume that the variable pitch pulleys 156 and 159 are adjusted to provide a first predetermined speed ratio between the strip material S' and the carriage 12'. This will cause the belt S' to discharge from the guide roll assembly along the dashed lines $S'_1$ which deposits the material S' along the entire length of the container $B'1$. On the other hand, assume that a second size container $B'2$ is employed. In this event the variable pitch pulleys 156 and 159 are adjusted such that the relative speed of the strip material S' is increased relative to the carriage 12'. This will cause the end of the strip material S' to bow outwardly along the phantom lines $S'2$ as shown in FIG. 12 as a result of the greater quantity of material being discharged from guide roll assembly 54' than when the material is traveling at a slower speed relative to carriage 12'. As a result of this bowing outwardly of the strip material, a greater length of material will be laid into the larger container $B'_2$ for each pass of the carriage 12'. Conversely, if a shorter container $B'_3$ is employed, the speed of the strip material is decreased relative to that of carriage 12' by adjustments of pulleys 156 and 159, whereby a lesser quantity of material will be discharged. The material S' will follow the paths shown by dashed lines $S'_3$ as defined by container $B'_3$. It will therefore be appreciated that by adjusting the variable pitch pulleys 156 and 159 the length of the material laid in the container can be adjusted to match the container size.

An alternate method of threading the material S' through the machine, is shown in FIG. 12. Here, a leader of belting material 160 having a hook 161 affixed to each end may be employed. The leader 160 is left in the machine when not in operation so that attachment by means of hook 161 may be made rapidly to the end of a strip material when a laying operation is to commence. After the material S' has been passed through the machine, the leader 160 may be removed as the material begins discharging into the container B'. After the completion of the strip laying operation, the leader may be hooked to the end of the strip as shown in FIG. 12 for being rethreaded through the machine in preparation for a subsequent operation. In addition, the drive roll 30' may be coupled to the shaft 34' by means of a racket (not shown) which relative movement between shaft 34' and roller 30' in one direction of rotation.

In order to prevent kinking in the chains 80 drives the carriage 12' as a result of the forces exerted on the drive finger 94', chain 80 is provided with standard roller chain attachments 164 and small rollers 165 for a distance of three or four chain links ahead of finger 94 as shown in FIG. 13. This keeps chain 80 rigid while pulling the carriage but allows said chain to bend around sprockets 89. As a result chain 80 does not kink at the finger and produces smoother chain operation. Similar roller attachments are provided in chains 82' and 106'.

While only a few embodiments of the invention are disclosed, it is not intended to be limited thereby but only by the scope of the appended claims.

I claim:

1. Apparatus for laying a strip material, including support means extending generally in a first direction,
   first translating means movably mounted on said support means,
   first drive means coupled to said first translating means for moving the same on said support means in said first direction and in an opposite direction,
   said first drive means including reversing means for reversing the direction of movement of said first translating means after the latter has moved a predetermined distance in either of said first or opposite directions,
   second translating means,
   material discharge means including directing means mounted on said second translating means for directing said material,
   second drive means mounted on said first translating means and coupled to said second translating means for moving the same in a direction generally normal to said first direction, said second drive means being normally inactive and being coupled to said first drive means and being operative to step said second translating means an incremental distance in said generally normal direction each time said reversing means reverses the direction of travel of said first translating means, said second drive means being inactive between reversals of said first translating means,
   said material discharge means including drive roller means for engaging said strip material and for feeding the same to said directing means, said drive roller means being mounted for rotation on said support means about an axis generally parallel to said generally normal direction and spaced from said directing means, and including means for adjusting the relative speeds of said drive roller means and said first drive means to adjust the speed of said material relative to that of said first translating means to thereby adjust the length of material laid for each direction reversal of said frist translating means.

2. The apparatus set forth in claim 1 wherein said first translating means comprises carriage means, supporting means for supporting and directing said second translating means, said supporting means being mounted on said carriage means and extending in a direction generally normal to said first direction, said second translating means being movably mounted on said supporting means for movement thereon in said generally normal direction.

3. The apparatus set forth in claim 2 and including elongate means having one end pivotally mounted adjacent said drive roller means and an opposite end pivotally mounted on said second translating means,
   and guide means mounted on said elongate means for guiding said strip material toward said directing means whereby said strip material will be guided from said drive roller means to said directing means as the latter moves in said first and opposite directions with said first translating means and in said generally normal direction on said second translating means.

4. The apparatus set forth in claim 3 wherein said first drive means includes first endless chain means and a first pair of spaced apart sprocket means rotatably mounted on said support means, first finger means pivotally mounted on said carriage means and coupled to said first chain means, said first drive means including means for rotating one of said first pair of sprocket means.

5. The apparatus set forth in claim 4 and including arm means coupled to said first chain means and being pivoted through a predetermined angle when the direction of said carriage means is reversed, said second drive means being connected to said arm means and being operative to move the second translating means through said incremental distance when said arm means is pivoted.

6. The apparatus set forth in claim 5 wherein said second drive means includes a second endless chain means and a second pair of spaced apart sprocket means mounted on said carriage means in general parallelism with said elongate means, second arm means pivotally coupled to said second translating means and coupled to said second chain means, said first arm means being coupled to one of said second pair of sprocket means for rotating the latter through a predetermined angle each time said first arm means rotates.

7. The apparatus set forth in claim 6 wherein said carriage means includes roller means, said support means including track means for said roller means.

8. The apparatus set forth in claim 7 wherein said drive roller means is mounted on bearing means fixedly mounted on said support means above the reciprocal path of said first translating means.

9. The apparatus set forth in claim 8 wherein said supporting means comprises rod means, said second translating means being slidably mounted on said rod means.

10. The apparatus set forth in claim 9 wherein said track means includes spaced apart portions generally parallel to said first direction, said carriage means including spaced apart roller means, one of said roller means being mounted on each of said spaced apart portions, said rod means extending between said roller means.

11. The apparatus set forth in claim 10 wherein said second chain means extends in general parallelism with said rod means and in proximity with said roller means, said second translating means being movable with said second chain means between spaced apart portions adjacent said roller means.

12. Apparatus for laying a strip material including support means extending generally in a first direction, first translating means movably mounted on said support means, first drive means coupled to said first translating means for moving the same on said support means in said first direction and in an opposite direction, said first drive means including reversing means for reversing the direction of movement of said first translating means after the latter has moved a predetermined distance in either of said first or opposite directions, second translating means, material discharge means including directing means mounted on said second translating means for directing said material, second drive means mounted on said first translating means and coupled to said second translating means for moving the same in a direction generally normal to said first direction, said material discharge means also including drive roller means for engaging said strip material and for feeding the same to said directing means, said drive roller means being mounted on bearing means fixedly mounted on said support means above the reciprocal path of said first translating means, and means for adjusting the relative speeds of said drive roller means and said first drive means to adjust the speed of said material relative to said first translating means to thereby adjust the length of material laid for each direction reversal of said first translating means.

13. The apparatus set forth in claim 12 and including elongate means having one end pivotally mounted adjacent said drive roller means and an opposite end pivotally mounted on said second translating means, and guide means mounted on said elongate means for guiding said strip material toward said directing means whereby said strip material will be guided from said drive roller means to said directing means as the latter moves in said first and opposite directions with said first translating means and in said generally normal direction on said second translating means.

14. The apparatus set forth in claim 13 wherein said first translating means comprises carriage means, supporting means for supporting and directing said second translating means, said supporting means being mounted on said carriage means and extending in a direction generally normal to said first direction, said second translating means being movably mounted on said supporting means for movement thereon in said generally normal direction.

* * * * *